United States Patent
Farqué

(10) Patent No.: US 6,489,771 B1
(45) Date of Patent: Dec. 3, 2002

(54) PASSIVE EXTERNAL NOISE-CANCELING DYNAMIC MAGNETIC FLUX SENSOR FOR DETECTING THE PRESENCE AND DIRECTION OF MOVEMENT OF A PIG IN A PIPE

(76) Inventor: Claude A. Farqué, 6600 S. 223rd E. Ave., Broken Arrow, OK (US) 74014

(*) Notice: Subject to any disclaimer, the term of this patent is extended or adjusted under 35 U.S.C. 154(b) by 0 days.

(21) Appl. No.: 09/619,835

(22) Filed: Jul. 20, 2000

(51) Int. Cl.$^7$ .................. G01V 3/10; G01R 33/022; G01B 7/14
(52) U.S. Cl. .............. 324/326; 324/345; 324/258; 324/225; 324/207.12; 324/207.24
(58) Field of Search ................ 324/326, 345, 324/67, 253, 254, 255, 258, 260, 241, 244, 245, 207.12, 207.15, 207.24, 225

(56) References Cited

U.S. PATENT DOCUMENTS

| | | | |
|---|---|---|---|
| 2,213,357 A | * 9/1940 | Barth ............................ | 33/361 |
| 2,315,045 A | * 3/1943 | Breitenstein .................. | 310/12 |
| 2,446,939 A | * 8/1948 | MacCallum ................. | 324/253 |
| 2,709,783 A | * 5/1955 | Hare ........................... | 324/245 |
| 2,966,853 A | * 1/1961 | Gilfillian et al. ............ | 102/417 |
| 2,999,135 A | * 9/1961 | Wiegand .................... | 360/111 |
| 5,444,364 A | * 8/1995 | Satterwhite et al. .......... | 324/67 |

* cited by examiner

Primary Examiner—Edward Lefkowitz
Assistant Examiner—Reena Aurora
(74) Attorney, Agent, or Firm—Frank J. Catalano

(57) ABSTRACT

An inductive magnet sensor has two identically wound magnetic antennae connected in series, out of phase, spaced axially from one another, and placed outside and parallel to the axis of a magnetic pipe so that induced noise voltages from the symmetrical noise magnetic flux of the pipe mostly cancel, leaving the responsiveness of the antennae undiminished to sense the non-symmetrical magnetic flux from a permanent magnet or a signal from a transmitter passing through the pipe. The enhanced signal of each of these antennae is then resistively attenuated, one fixed and the other adjustable, to further enhance the cancellation after placement of the sensor outside of the pipe. This balance adjustment improves the signal to noise ratio of the combined signal and the sensor is adjustably resistively attenuated to set the gain to enhance the dynamic range after mounting on the pipe. This balanced and attenuated signal is then assessed to determine whether sufficient induction by the magnetic flux from the permanent magnet or from the transmitter in either antenna or the region in between qualifies as a legitimate sensing event. If so, an appropriate indicator such as an LED is energized to indicate the passage of the magnet or transmitter.

14 Claims, 7 Drawing Sheets

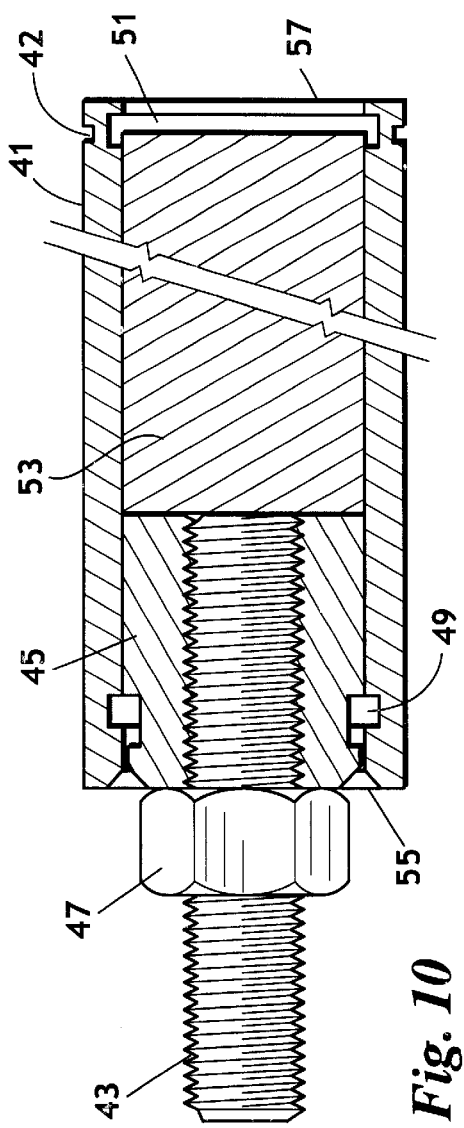
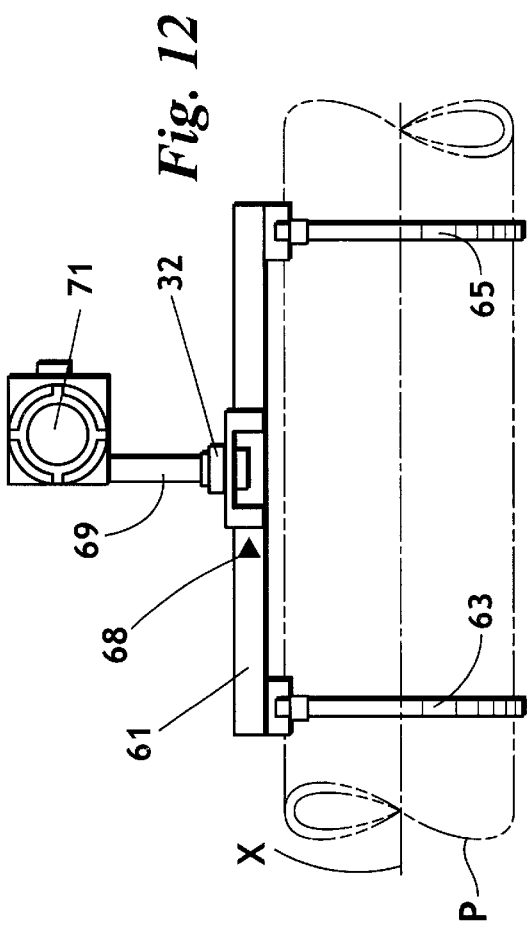
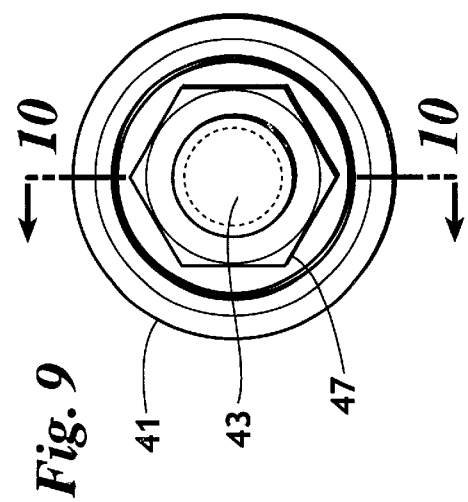
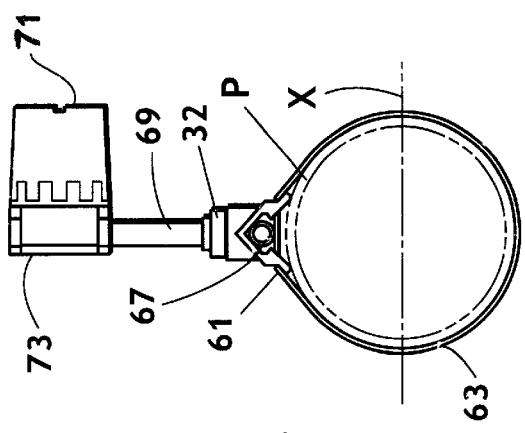

PASSIVE EXTERNAL NOISE-CANCELING DYNAMIC MAGNETIC FLUX SENSOR FOR DETECTING THE PRESENCE AND DIRECTION OF MOVEMENT OF A PIG IN A PIPE

BACKGROUND OF THE INVENTION

This invention relates generally to pipeline monitoring systems and more particularly concerns a sensor for detecting passage of a "pig" through a pipeline.

Operators of pipelines use pigs in a variety of activities including the separation of different liquids or gasses as they are conveyed through the pipeline and cleaning the pipeline of foreign materials. Generally, the pipeline operator uses mechanical or "dumb" pigs for such applications. Sensing the passage of "dumb" pigs through pipelines is historically accomplished by mechanical means. Intrusive threaded adapters are welded in place with spring-loaded shafts extending into the pipe. The shafts are temporarily deflected by the pig as it moves through the pipe and a spring-loaded lever or flag is released to give a visual indication of the pig's passage. By locating many of the intrusive pig "signalers" along the pipeline, the operator can monitor the progress of a pig through the line by the sequential release of the flags. Occasionally, operators need to ascertain the condition of their pipeline. "Dumb" pigs are not useful in these applications so active "smart" pigs with sensors and recording means are used. "Smart" pigs have a circumferential array of sensors which spring radially to snug them against the inside of the pipe to measure the pipe wall thickness about every eighth of an inch as the pig moves through the pipe.

Intrusive adapters are fraught with problems. For one, an annular high-pressure rotary or sliding shaft seal is necessary to prevent product inside the pipe from escaping as the shaft moves in either direction. Moreover, while many products carried by the pipeline are not corrosive to steel, they do make the annular high-pressure rotary or sliding seal of an intrusive signaler very difficult to achieve. Another problem is that, in preparation for the next pig passage, the operator expends considerable field time manually compressing the flag springs and ensuring that their detents are properly positioned to hold the springs compressed. To reduce the field time required to monitor the system, a multi-contact electrical switch could be actuated by the flag to power a local elevated incandescent signal lamp and/or possibly a remote readout panel. Even so, before the next pig passage, the operator would still have to return to each site to compress the flag spring, check the signal lamp and record any failures or malfunctions in his log. A further problem with intrusive adapter systems is that pipeline terrain is often mountainous, arid or subsea with exposure to ice heaves, mud slides, earthquakes, hurricanes, lightening, forest fires and other hazards that could damage signalers previously logged as fully functional. Another serious problem is that gaseous products separated by "dumb" pigs are a hazard to the spring-loaded shaft because the pigs often become temporarily stuck on welds in the pipe or at low spots along the line. Pressure slowly builds behind the stuck pig and eventually when it becomes unstuck the pig is, for a distance of several hundred yards, accelerated to speeds much faster than the average speed of the product. The shafts of the signalers are, therefore, sometimes sheared off as the high speed pig encounters them. Whatever the cause, if any of the welded threaded adapters are defective, maintenance or replacement involves great expense. The pipe must be exposed so that the defect can be viewed. Chippers remove the protective corrosion coating, grinders gently remove some of the smaller defects, cutting torches remove some of the larger defects and welders reweld the original threaded adapter to the pipe. If the original threaded adapter is not reusable, it is removed from the pipe with a cutting torch and its replacement is welded to the pipe. After approval of the work by a quality control group, the pipe must be sandblasted and coated with anti-corrosive material.

The use of "smart" pigs introduces additional problems. For example, "smart" pigs are very rigid and can only tolerate roughly a 20% reduction in pipe diameter. Consequently, all of the intrusive components must often be removed from the pipeline to prevent damaging the "smart" pig and also to prevent the "smart" pig from damaging the intrusive signaler. In "smart" pigs which use magnetic sensors, the magnets are so strong that they saturate the magnetizable steel pipe wall so that, as the "smart" pig moves its magnets beyond the previously saturated steel pipe regions, the regions do not return to zero magnetization but retain roughly 20% of the magnetization. For magnetic sensor "smart" pig systems, the industry standard signal frequency of 22 Hz adopted about 20 years ago for transmitters is lower than power line frequencies of 50 Hz and 60 Hz and lower than the first subharmonic for line powered cathodic protection systems at 25 Hz and 30 Hz. However, some European electric railroads use 50 Hz/3, or 16.6 Hz with a first subharmonic at 8.3 Hz. Therefore, this frequency results in a significant noise problem which is barely addressed by improved active filters and algorithms. For systems with their antenna close to the pipe, the noise ratio at 22 Hz is well beyond the capabilities of the lower power, battery powered, active filters required by the industry. This signal to noise ratio gets worse as the system operating frequency is lowered towards static or DC because of the electrical railroad frequency at 16.6 Hz/8.3 Hz, the AC components of the cathodic protection systems at 50 Hz/25Hz, the DC components of the same systems and the static residual 20% magnetization after "smart" pig runs.

The industry's standard portable non-noise canceling single antenna for sensing industry standard 22 Hz transmitters and its associated waveforms are illustrated in FIGS. 1 and 2. Since the industry standard transmitters generate an AC magnetic flux signal they can be sensed by the industry standard antennas when they are motionless in a magnetic steel pipe. This function can be done with either a clockwise or counterclockwise winding equally well, and the operator is free to inadvertently reverse the phasing of the induced EMF $e_1$ by rotating the entire antenna $A_1$. Consequently, while known sensors are used to indicate the presence of a pig in a pipeline, the direction of motion of the pig in the pipeline is not indicated by the sensor. For clarity, all of the physical components in FIG. 1 are shown in cross sectional views along their centerlines except for the permanent magnet PM and the last half turn of the winding W. The last half turn completes the output circuit and contributes to the induced EMF $e_1$. This permits the magnetic flux lines $F_1$, $F_2$ and $F_3$ to be drawn on the surface of the cross section where they are inside the entity. In the production antenna winding, thousands of turns of fine copper magnet wire are used to provide the needed sensitivity. However, in FIG. 1, the winding W is shown as a uniformly spaced solenoid of magnet wire to permit the details of the core C, winding W, magnetic fluxes $F_1$, $F_2$ and $F_3$ and induced EMF $e_1$ to be graphically presented. To minimize perturbations in the flux paths $F_2$ and $F_3$ threading through the magnetic steel core C of the antenna $A_1$, a winding W and a core C of equal length $L_1$ are used. This fully distributed winding W further makes the axes of symmetry $Z_1$ and zero crossing $Z_2$ of the antenna $A_1$ coincident and perpendicular to the axis of movement X of the permanent magnet PM. If there were no permanent magnet PM and no pipe P, the residual magnetic flux $F_3$ from the magnetic core C of the antenna $A_1$ would close upon itself in a static fashion, thus inducing no EMF. If there were no pipe P and a permanent magnet PM moved uniformly in relation to the antenna $A_1$, when the centerline of the permanent magnet PM crossed the axis of symmetry $Z_1$, for each positive induction in the winding W by each line of dynamic magnetic flux $F_2$ there would exist by reason of symmetry an equal and opposite induction so that the net induction would be zero. Looking at FIG. 2, with no pipe P, the induced EMFs are at their maximum as shown in the no pipe plot $P_{NO}$. All these EMFs must have symmetrical positive and negative areas separated by five zero crossings $O_1$, $O_2$, $O_3$, $O_4$, and $O_5$ which is characteristic of this non-noise canceling antenna $A_1$. The peak positive and negative inductions for any material in the core C would occur on either side of the axis of zero crossing $Z_2$, even for magnetic material with zero magnetic resistance or an air core. With a pipe P and with a permanent magnet PM uniformly moving in a positive direction $M_P$ and having north N and south S polarity as shown, it may not be apparent that the peak positive or negative inductions would still occur just before or after the centerline of the permanent magnet PM crosses the axis of zero crossing $Z_2$, providing they share the same axis of symmetry $Z_1$. The pipe material and its geometry would only slightly influence the location of the axis of zero crossing $Z_2$ as long as there is a compensating variation on each side of the axis of symmetry $Z_1$. However, the amplitudes of the peak inductions for both positive and negative movement directions would be strongly influenced by the pipe material and its geometry. The above analysis has been experimentally confirmed. The EMF plot $P_{TK}$ results for thick pipe and for a permanent magnet PM moving in the positive direction $M_P$. The EMF plot $P_{TNP}$ results for a thin pipe with the permanent magnet PM moving in the positive direction $M_P$. The dashed EMF plot $P_{TNN}$ results for thin pipe with the same permanent magnet PM moving in the negative direction $M_N$. The axis of zero crossing $Z_2$ for the permanent magnet PM would be the location of peak coupling for a transmitter. This is the industry standard arrangement for magnetic transmission through a magnetic pipe to a magnetic core antenna. This arrangement also introduces problems to the pig monitoring systems. Since there is no noise canceling in this antenna $A_1$, the induced EMF $e_1$ requires the use of active filters to improve the signal to noise ratio before it can be assessed to determine whether it qualifies as a legitimate transmitter event. As earlier discussed, the transmitter and the active filter operate at the industry standard 22 Hz. The typical design spacing $S_1$ between the axis of the antenna $X_1$ and the outer surface $P_{OD}$ of the magnetic pipe wall used throughout the industry is about two feet minimum. However, in many applications, the pipe P is buried twenty or more feet below ground level. Making an antenna sensitive enough to operate at a spacing $S_1$ of twenty feet requires thousands of turns of magnet wire. Consequently, when the spacing $S_1$ is reduced to about two feet, the noise induced by the flux $F_3$ in these thousands of turns begins to overload the active filters and the distinction between noise and signal cannot be reliably maintained. Noise is, therefore, often mistaken for a transmitter signal.

Even with proper phasing and no pipe, so that no medium magnetic flux $F_3$ is present to generate any noise and no filter is needed, known sensors still have directionality problems. Assume that a constant medium strength 22 Hz transmitter is so remote that it does not induce any appreciable EMF in the winding W and that its steady movement is towards the axis of zero crossing $Z_2$. The steady movement of the transmitter will steadily increase the magnitude of the induced EMF $e_1$ until the transmitter location of peak coupling is reached at the axis of zero crossing $Z_2$. As the transmitter continues to move away from the axis of zero crossing $Z_2$, the magnitude of the induced EMF $e_1$ now declines through the same magnitudes previously induced as it moved towards the axis of zero crossing. This symmetry in magnitudes of the induced EMF $e_1$ is characteristic of any single antenna scheme. Consequently there is no distinguishing between the two directions for a transmitter.

It is, therefore, an object of this invention to provide a noise canceling dynamic magnetic flux sensor which is non-intrusive to the monitored pipeline. Another object of this invention is to provide a noise canceling dynamic magnetic flux sensor which eliminates the need for seals between the sensor and the pipeline wall. A further object of this invention is to provide a noise canceling dynamic magnetic flux sensor which eliminates the shearing of indicator components of the sensor. Yet another object of this invention is to provide a noise canceling dynamic magnetic flux sensor which reduces the likelihood of physical damage to the sensor or the pig. It is also an object of this invention to provide a noise canceling dynamic magnetic flux sensor which reduces the maintenance requirements for the sensor. Still another object of this invention is to provide a noise canceling dynamic magnetic flux sensor which eliminates the need for manual resetting of in-field indicators between pig runs. An additional object of this invention is to provide a noise canceling dynamic magnetic flux sensor which reduces the need for in-field inspection of signaler conditions. Another object of this invention is to provide a noise canceling dynamic magnetic flux sensor which minimizes the size of the sensed magnet so as to operate in small magnetic pipe. A further object of this invention is to provide a noise canceling dynamic magnetic flux sensor which effectively cancels noise imposed on the sensor, including railroad frequency and cathodic protection system frequency noise and is non-responsive to cathodic protection system DC component noise and static residual pipeline magnetization noise. Yet another object of this invention is to provide a noise canceling dynamic magnetic flux sensor which eliminates the need for active filters to improve noise ratios in the detected signals. It is also an object of this invention to provide a noise canceling dynamic magnetic flux sensor which reduces the impact of spacing variations between the sensor and the pipeline. Still another object of this invention is to provide a noise canceling dynamic magnetic flux sensor which is adjustable in the field to account for the specific noise characteristics of the sensor location. A further object of this invention is to provide a noise canceling dynamic magnetic flux sensor which can distinguish direction of movement by transmitters and permanent magnets in magnetic steel pipe.

SUMMARY OF THE INVENTION

Noise canceling can be achieved by connecting, in series and out of phase, a pair of inductive sensors, identically constructed and symmetrically situated, so that the symmetrical noise magnetic flux from the pipe threading through a portion of the winding of the first sensor will identically thread through a portion of the winding of the second sensor as it returns to the pipe. An inductive magnetic sensor is not responsive to DC noise and, by adding turns to the winding, the system detects small permanent magnets moving slowly through large diameter magnetic pipe with thick walls. Any change in the symmetrical noise magnetic flux from the pipe induces equal and opposite EMFs in the identical portions of the two identical windings. This passive cancellation of these two EMFs creates a virtual noise ground node somewhat like the active virtual ground created at the inverting input terminal of an operational amplifier configured as an inverter. This noise cancellation is not derived from the properties of the materials along the path of the threading magnetic flux but only from the symmetrical disposition of the materials about the axis of symmetry. This noise cancellation is not related to frequency and is fully operative from near static to near RF frequency range. Preferably, magnetic steel cores are used to enhance the EMF induced in the antennae. The magnetic core material minimizes the end effects that occur in any solenoid winding by providing an alternate route of lower magnetic resistance for any magnetic flux passing through it than would air.

Accordingly, a noise canceling dynamic magnetic flux sensor is provided for detecting the passage along the centerline of a magnetic steel pipeline of a pig containing a permanent magnet or transmitter. The sensor has a noise-canceling inductive array for sensing the dynamic non-symmetrical signal magnetic flux resulting from passage of the permanent magnet or transmitter. The array has first and second substantially identical magnetic steel cores in end-to-end spaced-apart alignment on a common longitudinal axis and first and second substantially identical inductive coils uniformly wound about the first and second cores, respectively. The coils are wound for symmetry of the sensor about an array axis which is perpendicular to the longitudinal axis of the cores and bisects the space between the cores. The coils may be wound in either clockwise or counter-clockwise directions with their lead wires interconnected to establish the out-of-phase noise canceling of the symmetrical noise magnetic flux from the pipe. The cores and coils are secured externally of the pipe with the longitudinal core axis parallel to the pipe centerline. The sensor has a first circuit electrically connected to the coils for detecting at least non-symmetrical portions of a Faraday induced electromotive force across the coils and a second circuit responsive to the detecting circuit to generate electrical signals indicative of the passage and direction of a permanent magnet or transmitter across the array axis.

BRIEF DESCRIPTION OF THE DRAWINGS

Other objects and advantages of the invention will become apparent upon reading the following detailed description and upon reference to the drawings in which:

FIG. 9 is an end elevational view of a preferred embodiment of a permanent magnet for detection by the noise-canceling sensor;

FIG. 10 is a cross-sectional view taken along the lines 10—10 of FIG. 9;

FIG. 11 is an end elevational view of the sensor of FIG. 5 mounted on a pipeline; and FIG. 12 is a side elevational view of the sensor of FIG. 5 mounted on a pipeline.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
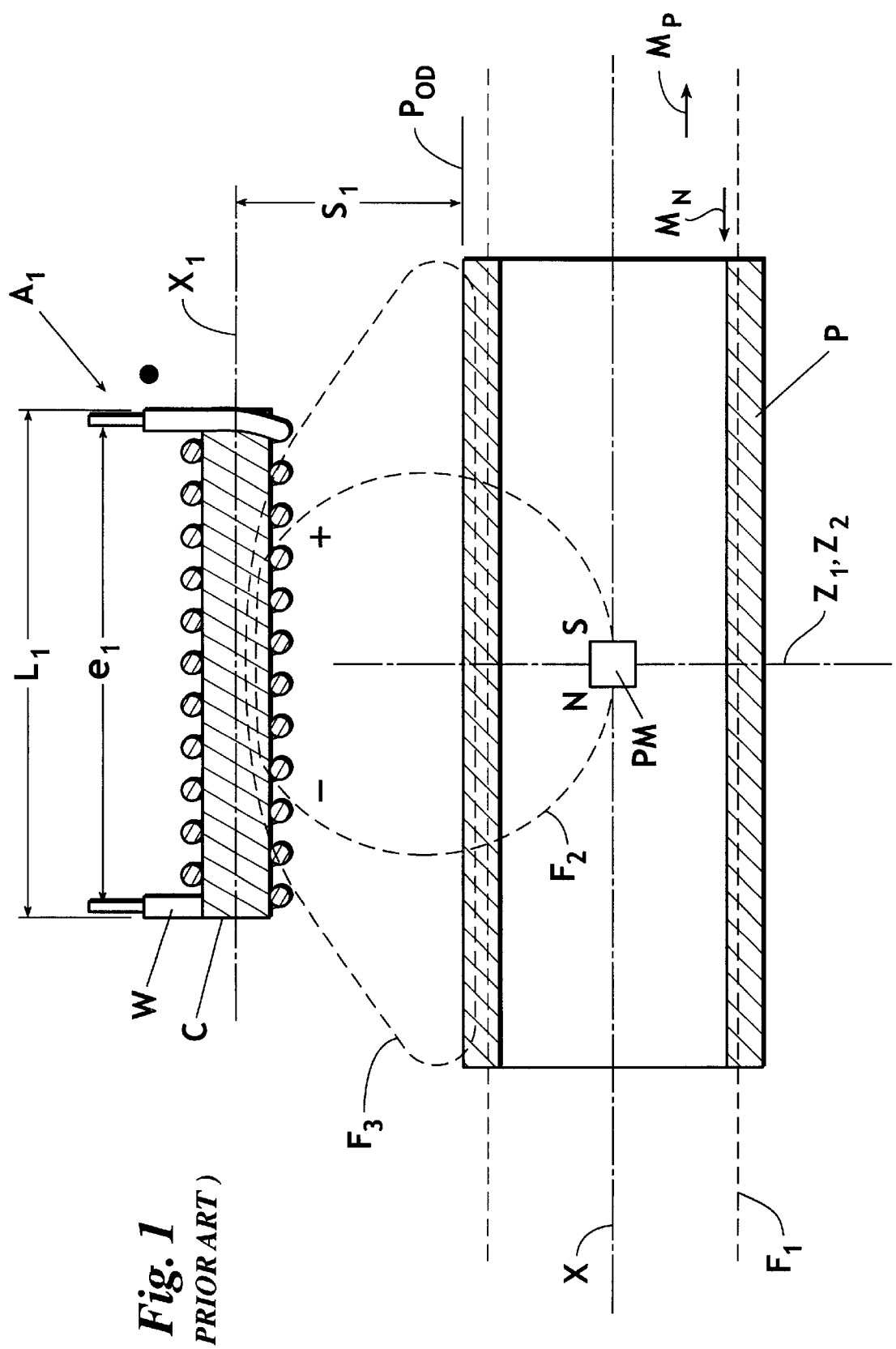
FIG. 1 is a partially cross-sectional, partially elevational and partially diagrammatic view of the prior art non-noise canceling sensor.
Figure 2:
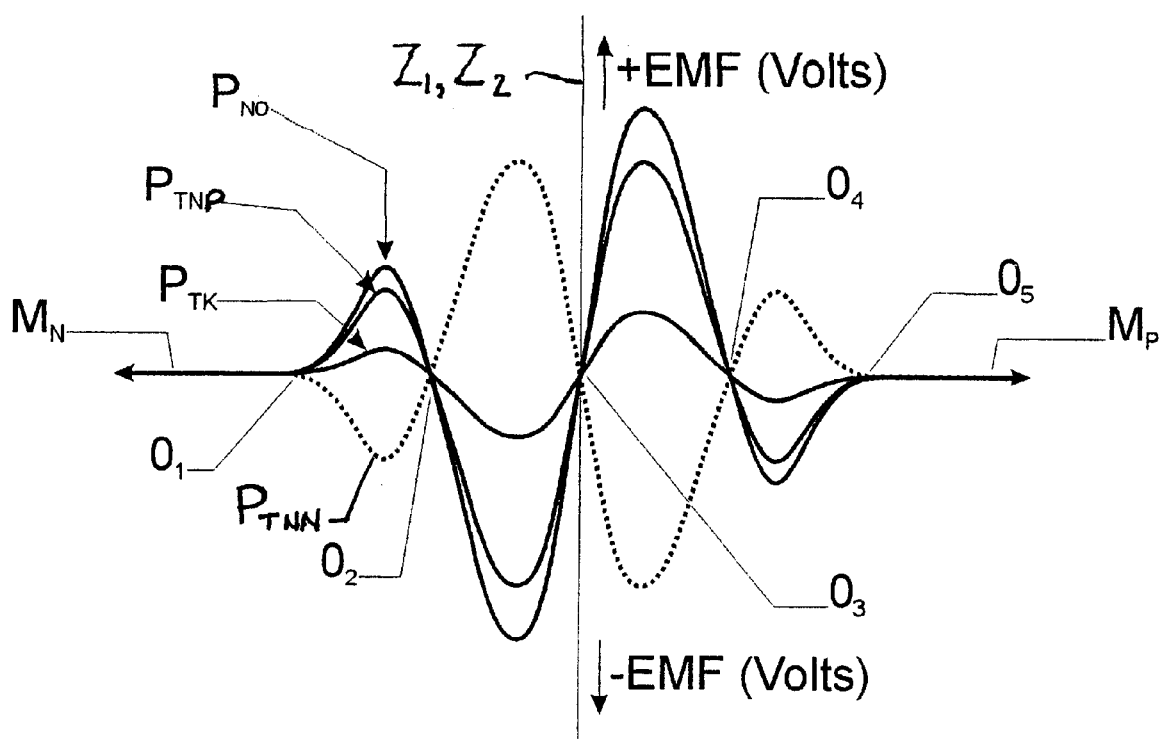
FIG. 2 is a graphic illustration of the voltage plots of the sensor of FIG. 1 for various pipe thicknesses and permanent magnet directionality.
Figure 3:
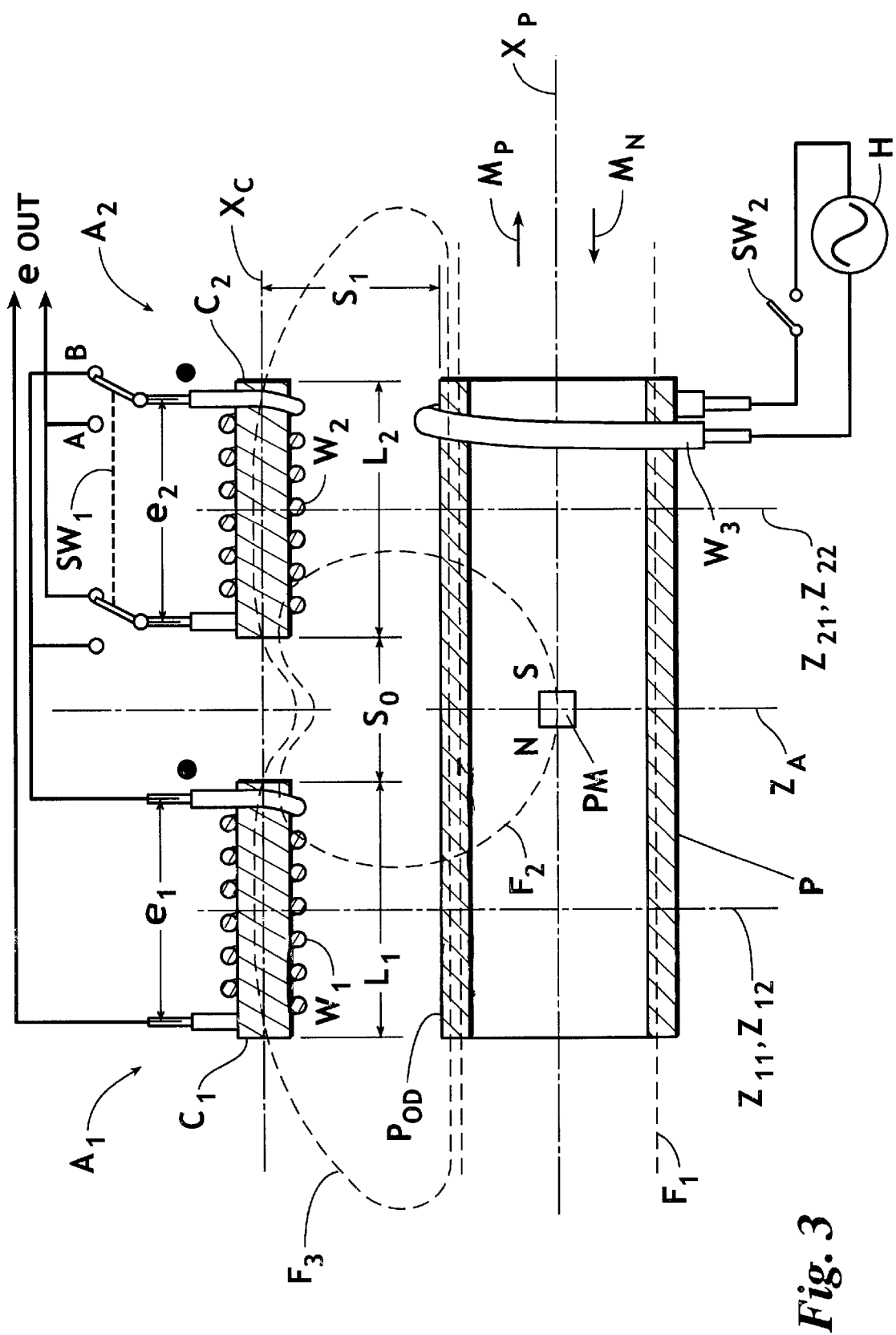
FIG. 3 is a partially cross-sectional, partially elevational and partially diagrammatic view of a test noise-canceling sensor; and its associated output voltage plot illustrating the principles of the present invention.
Figure 5:
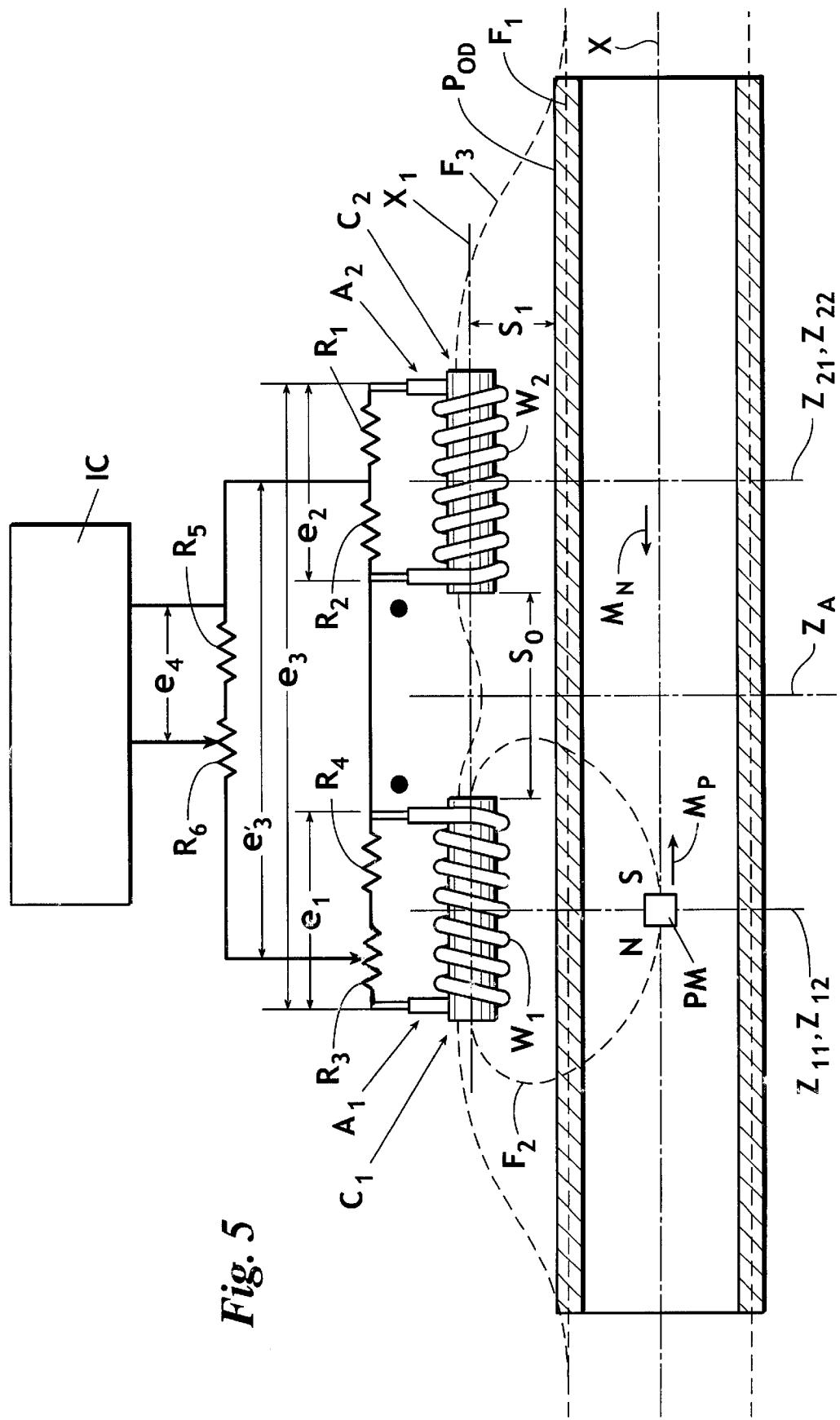
FIG. 5 is a partially cross-sectional, partially elevational and partially diagrammatic view of a preferred embodiment of a noise-canceling sensor of the present invention.

A magnetic steel pipe makes an almost ideal shield for any type of electromagnetic transmission except at static or DC conditions. Even in static or DC conditions, the pipe is not transparent because a sea of strong magnetic flux lines inside the magnetic steel pipe walls in turn creates a sea of weaker magnetic flux lines both inside and outside the pipe. For dynamic or AC conditions through the same pipe for the same magnitude of flux lines, the attenuation is much greater because of the eddy current losses and the magnetic steel hysteresis losses. The pipe only permits the flux from the magnetic transmission source to displace one of its lines of flux which in turn displaces yet another until eventually an attenuated flux line is established on the opposite side. In FIGS. 1, 3 and 5, only a few of the actual number of magnetic lines in these seas are shown.

Figure 4:
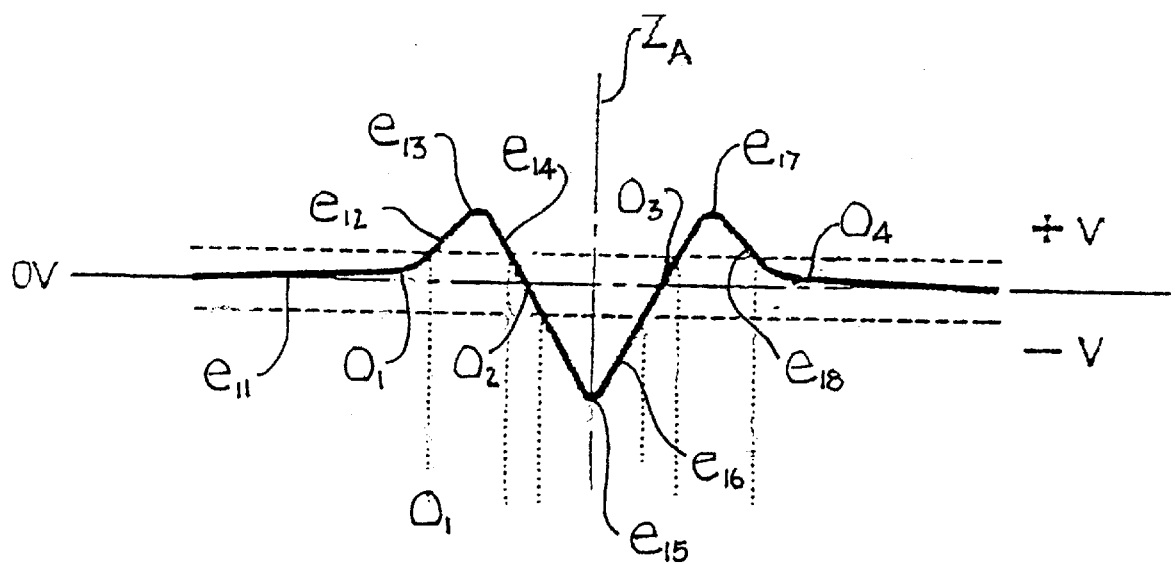
FIG. 4 is a graphic illustration of a typical voltage plot of the test sensor of FIG. 3.

Turning to FIGS. 3 and 4, a sensor test system is illustrated in conjunction with its output voltage plot in the noise canceling condition. For clarity, all of the structural components are shown in cross sectional views along their centerlines except for the last half turns of the windings $W_1$ and $W_2$ and the permanent magnet PM. The last half turns of the windings $W_1$ and $W_2$ complete the output circuit and respectively contribute to the induced EMFs $e_1$ and $e_2$ of each. Also, to better represent the production windings $W_1$ and $W_2$, they are concentrated symmetrically towards the center of their magnetic cores $C_1$ and $C_2$. They share the same axis $X_C$ which is parallel to the axis $X_P$ of the pipe and to the axes of positive and negative movement $M_P$ and $M_N$ of the permanent magnet PM. The spacing $S_0$ between the magnetic cores $C_1$ and $C_2$ of the antennae $A_1$ and $A_2$ is necessary to permit magnetic flux $F_3$ and $F_2$ from the pipe P and permanent magnet PM to freely thread through the cores $C_1$ and $C_2$. This is preferred to a single magnetic core with two windings. The axes of zero crossing $Z_{12}$ and $Z_{22}$ for both antennae $A_1$ and $A_2$ occur, as for the single antenna in FIG. 1, on their respective axes of symmetry $Z_1$, and $Z_{21}$. The test spacing $S_1$ between the longitudinal axis $X_C$ of the antennae $A_1$ and $A_2$ and the outer surface $P_{OD}$ of the magnetic pipe wall is preferably selected to be less than six inches but this can vary considerably depending on the application being analyzed. A double-pole, double-throw switch $SW_1$ allows the clockwise windings $W_1$ and $W_2$ to be operated in phase or out of phase. In one position A, they are in phase and $e_{OUT}=e_1+e_2$. In another position B, they are out of phase and $e_{OUT}=e_1-e_2$. The last half turn of a noise source winding $W_3$ completes its circuit and contributes to the magnetization of the magnetic test pipe P. A single-pole, single-throw switch $SW_2$ disconnects the noise source winding $W_3$ from a high power noise source H. The source H used is a line powered adjustable transformer with a welder operating at 60 Hz but the type of source is limited only by the imagination. The single turn winding $W_3$ is preferably an insulated flexible welding cable that can be slid into position along the length of the magnetic steel pipe P.

If the winding $W_3$ is positioned at the center of the test pipe P and equidistant from the axes of symmetry $Z_{11}$ and $Z_{21}$ of the antennae A1 and A2, if there is no permanent magnet PM and if the phase switch $SW_1$ is in the in-phase position A when the noise source switch $SW_2$ is closed, the high power noise source H will magnetize the magnetic steel pipe material at the 60 Hz rate, and this strong magnetic flux $F_1$ inside the pipe wall will result in the medium noise magnetic flux F3 identically threading through the magnetic cores $C_1$ and $C_2$ and windings $W_1$ and $W_2$ of the antennae $A_1$ and $A_2$, thus inducing identical EMFs $e_1$ and $e_2$ in each so that $e_1=e_2$. This precision doubling of induced EMFs is the behavior of an isolation transformer with a center tapped secondary, albeit with a great flux leakage because of the interrupted magnetic path from the primary winding $W_3$ to secondary windings $W_1$ and $W_2$, through flux leakage paths along the core-to-core spacing $S_0$ once and along the core-to-pipe spacing $S_1$ twice. Since $e_{OUT}=e_1+e_2$ and, by symmetry, $e_1=e_2$, then $e_{OUT}=2_{e1}=2_{e2}$. However, this is not very useful behavior because we have twice the induced EMF from the magnetic flux $F_3$ from the noise source H.

If all the conditions above discussed are the same except that the phase switch $SW_1$ is moved to the out-of-phase position B, then $e_{OUT}=0$, since, by symmetry, $e_1=e_2$. This, by itself, is not useful either, except that this cancellation of the induced noise EMFs does not change the sensitivity of the antennae $A_1$ and $A_2$ to signal EMFs induced by the dynamic magnetic flux $F_2$ from the permanent magnet PM simultaneously moving through the magnetic pipe P. This is the result of the flux leakage paths along the core-to-core spacing $S_0$ once and the core-to-pipe spacing $S_1$ twice.

Since the output $e_{OUT}$ is an induced EMF, it must have symmetrical positive and negative areas. Assume for convenience that the constant medium strength permanent magnet PM is always oriented with north N and south S polarity as shown in FIG. 3 and that, once set in motion, it moves uniformly in a positive or negative direction $M_P$ or $M_N$ at medium speed. When the permanent magnet PM is moving positively $M_P$ but located sufficiently remotely from the axis of symmetry $Z_A$ of the array, the induced EMF $e_{11}$ is zero. The leading south pole's S magnetic flux eventually begins at a first zero crossing $O_1$ to induce an increasingly positive EMF $e_{12}$ mostly in the first antenna winding $W_1$. This positive EMF reaches a peak $e_{13}$, followed by a declining positive EMF $e_{14}$ and then crosses zero for the second time $O_2$. This increasingly negative EMF has a negative peak $e_{15}$ or a negative local minimum at the axis of symmetry $Z_A$ followed by a declining negative EMF $e_{16}$ until zero crossing occurs for the third time $O_3$. This increasingly positive EMF reaches a peak $e_{17}$ followed by a declining positive EMF $e_{18}$ until finally the lagging north pole's N magnetic flux ceases to induce any further positive EMF mostly in the second antenna winding $W_2$, when the permanent magnet PM is sufficiently remotely located from the axis of symmetry of the array $Z_A$. This is the fourth zero crossing $O_4$. Now, by reversing only the movement of the permanent magnet PM to negative $M_N$, all of the induced EMFs will have reversed polarities and the wave form of the output $e_{OUT}$ will be the same except it will be flipped about the 0V axis. The same result can be achieved by reversing only the north N and south S poles of the permanent magnet PM. If both the poles N and S and direction of travel $M_P$ and $M_N$ are reversed, the output $e_{OUT}$ is unchanged. To improve the signal to noise ratio and also to lower the movement necessary to induce a sufficient EMF in a large thick-walled magnetic pipe, the strength of the permanent magnet PM may be increased, or its physical dimensions may be increased, or both. Whatever the dimensions of the permanent magnet PM or its strength or its movement, when it crosses the axis of symmetry of the array $Z_A$ of the waveform, $e_{OUT}$ will be at a peak or a local minimum in the peak. With the noise source switch $SW_2$ open or closed, the output $e_{OUT}$ waveforms are essentially the same unless there is an inherent imbalance in the winding outputs $e_1$ and $e_2$, possibly because the number of turns $N_1$ and $N_2$ in the windings $W_1$ and $W_2$ is unequal $N_1 \approx N_2$ or because the core lengths $L_1$ and $L_2$ are unequal $L_1 \approx L_2$. These are but two of the many manufacturing tolerances that degrade the signal to noise ratio of this simplified test scheme. Many tests at varying parameters were run to confirm the expected performance of the sensor in varied conditions.

In any given application of the sensor, the specific criteria of the user will dictate its parameters. Given those criteria and then applying them to a test system such as that described above the appropriate parameters for the given application can be empirically determined. Turning to FIG. 5, a preferred embodiment of a sensor is illustrated which can be adapted to virtually any set of criteria. First and second antennae $A_1$ and $A_2$, consisting of magnetic cores $C_1$ and $C_2$ and windings $W_1$ and $W_2$, are longitudinally aligned and spaced apart by a distance $S_0$ which is parallel to and spaced apart by a distance $S_1$ from the outer wall of the pipe P, which extends long a longitudinal axis X. The antennae $A_1$ and $A_2$ are symmetrically arranged in relation to the axis of symmetry $Z_A$ of the array. To emphasize the fact that, in order to have noise canceling occur, the two windings $W_1$ and $W_2$ must be connected out of phase, the windings $W_1$ and $W_2$ are depicted as oppositely wound solenoids, one winding $W_1$ being clockwise and the other $W_2$ being counterclockwise. As above explained, however, if the solenoids are not oppositely wound, a reversing switch could be used to achieve the out-of-phase relationship. The antennae $A_1$ and $A_2$ individually have coincident axes of symmetry and zero crossing $Z_{11}$ and $Z_{12}$ and $Z_{21}$ and $Z_{22}$, respectively, which are symmetrically displaced from the axis of symmetry $Z_A$ of the array. The permanent magnet PM traveling along the pipe axis X in a positive or negative $M_P$ or $M_N$ direction from one axis of zero crossing $Z_{12}$ or $Z_{22}$ past the axis of symmetry $Z_A$ of the array to the other axis of zero crossing $Z_{22}$ or $Z_{12}$ results in magnetic flux patterns $F_1$, $F_2$ and $F_3$ which correspond to the patterns described in relation to FIG. 3, depending on the direction of travel $M_P$ or $M_N$ and assuming the same relationship of north N and south S polarity of the permanent magnet PM. To permit balancing between the two antennae EMFs, $e_2$ is resistively attenuated, preferably at a fixed −20% using series connected resistors $R_1$ and $R_2$, while $e_1$ is adjustably resistively attenuated, preferably from 0% to −40%, using series connected fixed and variable resistors $R_4$ and $R_3$. Together they yield a preferably net ±20% adjustment to enable the noise EMFs induced in the antennae $A_1$ and $A_2$ by the medium symmetrical noise magnetic flux F3 to be balanced to provide a useful EMF $e'_3$. In the unbalanced EMF $e_3$, noise cancellation is still fully operative but is likely not perfect unless identical antennae $A_1$ and $A_2$ were spaced identically $S_1$ from the pipe P with identical thickness of the pipe P along its length from the beginning point to the end point of induced EMF's $e_1$ and $e_2$. This near cancellation of the noise EMFs creates a near virtual noise ground node. The balanced EMF $e'_3$ is applied across series connected fixed and variable resistors $R_5$ and $R_6$ which provide an indicator circuit control voltage $e_4$. The indicator circuit control voltage $e_4$ is applied to any desirable indicator circuit IC as may be presently known in the industry to indicate the passage and direction of a permanent magnet PM or transmitter through the pipe P. Preferably, this circuit IC is also adjustable to optimize the specific operating parameters for the user's application.

Figure 6:
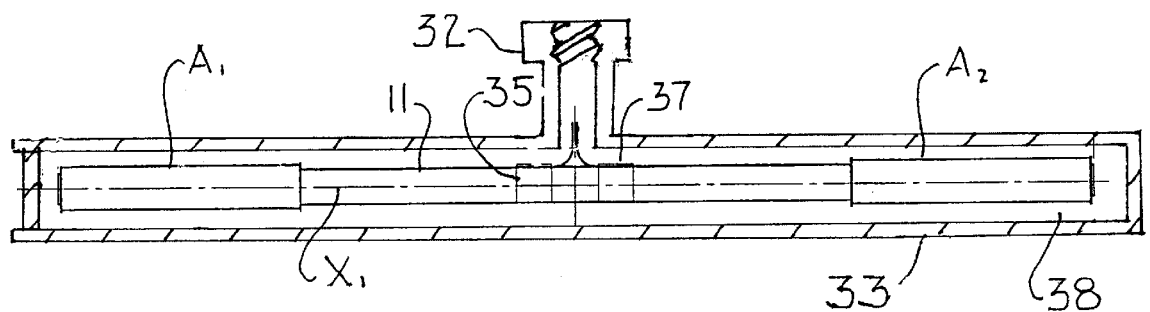
FIG. 6 is a partially cross-sectional and partially elevational view of a preferred embodiment of the antennae assembly of the sensor of FIG. 5.
Figure 7:
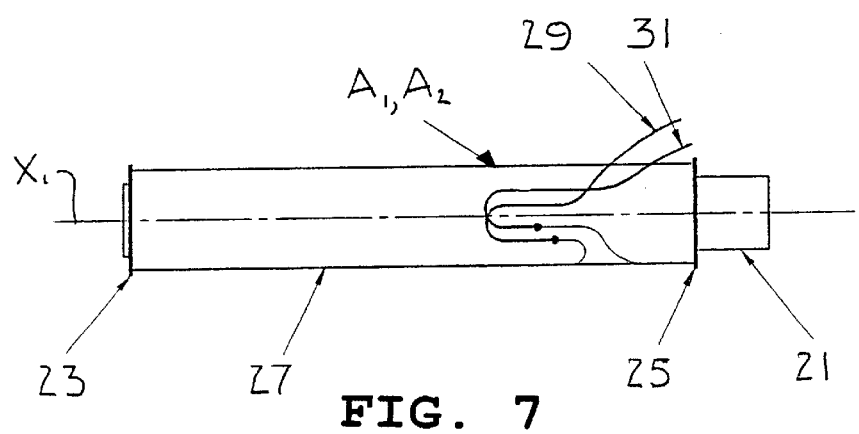
FIG. 7 is a side elevational view of a preferred embodiment of the antenna subassemblies used in the antennae assembly of FIG. 6.
Figure 8:
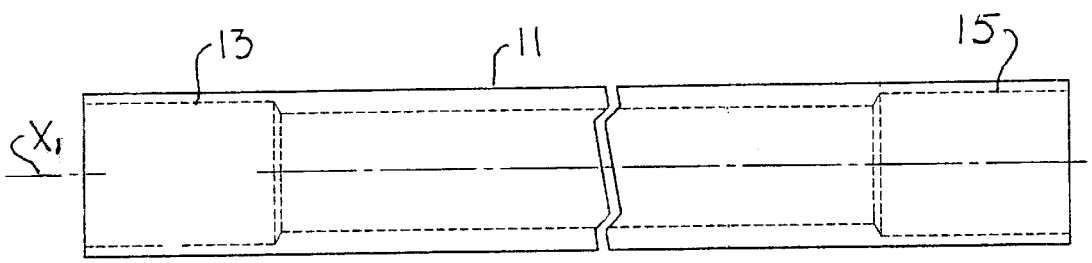
FIG. 8 is a side elevational view of a preferred embodiment of the spacer used in the antennae assembly of FIG. 6.

A preferred embodiment of the antennae assembly of the sensor is illustrated in FIGS. 6, 7 and 8. A tubular PVC spacer 11 is drilled axially at each end to provide concentric annular seats 13 and 15 in the ends of the spacer 11. The longitudinal axis $X_1$ of the spacer 11 is also the longitudinal axis of both antennae $A_1$ and $A_2$ Looking at FIG. 7, each of the antennae $A_1$ and $A_2$ consists of a section of steel bar 21 fitted with nylon bushings 23 and 25 proximate the ends thereof. Magnet wire 27 is uniformly wound on the bar 21 between the bushings 23 and 25. For example, a typical configuration might include some 8,500 turns of 30 gage magnet wire over a ¾" bar with bushings 6" apart. The ends of the magnet wire 27 have leads 29 and 31 soldered to them which are taped to provide a strain relief. As shown, preferably symmetrically opposite antennae $A_1$ and $A_2$ are mounted on the spacer 11 by inserting one end of the steel bar 21 of each antenna $A_1$ and $A_2$ into one of the seats 13 or 15, respectively, in the spacer 11. The leads 29 and 31 from each antenna $A_1$ and $A_2$ are extended to the midpoint of the spacer 11 and then through a conduit adapter 32 in a welded metallic housing 33. The leads 29 and 31 are held in place on the spacer 11 proximate the conduit adapter 32 by tape wraps 35 and 37. The entire antennae assembly within the housing 33 is encapsulated in an epoxy resin 38 to make the assembly water tight. Preferably, every opening in the assembly, including the interior of the spacer 11 and the conduit adapter 32, are filled with resin 38 in the sealing process.

Depending on the sensitivity of the noise canceling array, those skilled in the art, given the teachings contained herein, can empirically or by calculation vary the numbers of turns in antenna windings, the gage of the magnet wire, the length and diameter of the cores in windings, the core-to-core spacing and the core-to-pipe spacing of the device as well as the strength of the permanent magnet traveling in the pipe.

Turning to FIGS. 9 and 10, a preferred embodiment of the permanent magnet PM to be sensed is illustrated. A section of PVC tube 41 has an inner wall coated with an epoxy seal. The outer wall has a groove 42 or other visual and/or tactile indicator of the south pole. A stud 43 is secured within an insert 45 using permanent thread locking adhesive. A nut 47 is to be tightened on the stud 43 to fix the magnet PM to a pig (not shown) and will be secured in this position by use of a permanent thread locking adhesive. The insert 45 is longitudinally inserted into the PVC tube 41 where it is held in place by the epoxy seal and by stops 49 and 51. A steel magnet 53 is inserted into the PVC tube 41 with its south pole in contact with one stop 51 at one end of the tube 41. The insert 45 is inserted into the PVC tube 41 so that one of its ends abuts the magnet 53 and the other of its ends is substantially aligned with the other end of the PVC tube 41. The insert 45 is held in place by the other stop 49 which engages in the abutting circumferential surfaces of the insert 45 and the PVC tube 41. In addition to the stops 49 and 51, the epoxy coating on the inner wall of the PVC tube 41 secures the insert 45 and the magnet 53 within the PVC tube 41. Finally, compound 55 and 57 is used to seal and smooth the ends of the assembly within the PVC tube 41. Any known encapsulating compound can be used for this purpose. A typical permanent magnet assembly may range from approximately 3" to 11.5" in length with the permanent magnets themselves ranging from 1" to 9" in length with a 1" diameter.

Turning to FIGS. 11 and 12, the preferred mounting of a sensor on a pipe P is illustrated. A mounting foot 61, essentially in the shape of an angle iron, extends longitudinally in relation to the pipe P and is secured to the surface of the pipe P using stainless steel bands 63 and 65 which girt the pipe P and are proximate the ends of the mounting foot 61. The bands 63 and 65 are adjustable to be tautened about the pipe P. The antennae assembly 67 and housing 33 are disposed between the mounting foot 61 and the pipe P with the assembly longitudinal axis $X_1$ parallel to the pipe longitudinal axis X. A triangular impression 68 or other indication is provided to give visual and/or tactile indication of the direction of positive movement. A conduit 69 extends upwardly from the conduit adapter 32 carrying the leads 29 and 31 from each antenna $A_1$ and $A_2$ to the balancing circuit, field application tuning circuit and LCD display 71. A plug 73 further seals the open upper end of the conduit 69.

As a pig carrying a permanent magnet PM passes through the pipe P along the longitudinal axis X, the noise-canceling antennae $A_1$ and $A_2$ assures that a reliable pig passage indication signal will be derived from the EMF induced in the antennae $A_1$ and $A_2$ without the need for intrusive violation of the pipe integrity.

Thus, it is apparent that there has been provided, in accordance with the invention, a noise canceling dynamic magnetic flux sensor that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For detecting the passage along a centerline of a magnetic steel pipeline of a pig containing a permanent magnet, a noise-canceling inductive array for sensing dynamic magnetic flux resulting from passage of the permanent magnet comprising:

first and second substantially identical magnetic steel cores in end-to-end spaced-apart alignment on a common longitudinal axis; first and second substantially identical inductive coils uniformly wound about said first and second cores, respectively, said coils being symmetrically displaced from an array axis perpendicular to said longitudinal axis and bisecting a space between said cores;

means electrically connecting said coils in series and out of phase;

means for securing said cores and coils externally of the pipe with said longitudinal core axis parallel to the pipe centerline;

means electrically connected to said coils for detecting at least non-symmetrical portions of a Faraday induced electromotive force across said coils; and means responsive to said detecting means to indicate the passage of the permanent magnet across said array axis.

2. For detecting the passage along a centerline of a magnetic steel pipeline of a pig containing a permanent magnet, a noise-canceling inductive array for sensing dynamic magnetic flux resulting from passage of the permanent magnet comprising:

first and second substantially identical magnetic steel cores in end-to-end spaced-apart alignment on a common longitudinal axis;

first and second substantially identical inductive coils uniformly wound about said first and second cores, respectively, said coils being symmetrically displaced from an array axis perpendicular to said longitudinal axis and bisecting a space between said cores;

means electrically connecting said coils in series and out of phase;

means for securing said cores and coils externally of the pipe with said longitudinal core axis parallel to the pipe centerline;

means electrically connected to said coils for detecting at least non-symmetrical portions of a Faraday induced electromotive force across said coils; and means responsive to said detecting means to generate electrical signals indicative of the passage of the permanent magnet across said array axis.

3. An array according to claim 2, said first and second inductive coils being connected in series to provide an array induced EMF there across.

4. An array according to claim 3, said detecting means comprising means resistively attenuating an EMF induced across each of said first and second inductive coils.

5. An array according to claim 4, said attenuating means comprising first and second resistors connected in parallel with said first and second inductive coils, respectively.

6. An array according to claim 5, one of said resistors being variable to permit said resistively attenuating induced EMF's across said first and second inductive coils to be balanced.

7. An array according to claim 4, said attenuating means comprising first and second resistors connected in series with each other and in parallel with said first inductive coil and third and fourth resistors connected in series with each other and in parallel with said second inductive coil.

8. An array according to claim 7, one of said resistors being variable to permit said resistively attenuated induced EMF's across said first and second inductive coils to be balanced.

9. For detecting the passage along a centerline of a magnetic steel pipeline of a pig containing a permanent magnet, a noise-canceling inductive array for sensing dynamic magnetic flux resulting from passage of the permanent magnet comprising:

an elongated non-magnetic spacer;

first and second substantially identical magnetic steel cores, one mounted at each end of said spacer on a common longitudinal axis;

first and second substantially identical inductive coils uniformly wound about said first and second cores, respectively, said coils being symmetrically displaced from an array axis perpendicular to said longitudinal axis and bisecting said spacer;

means electrically connecting said coils in series and out of phase;

means for securing said cores and coils externally of the pipe with said longitudinal core axis parallel to the pipe centerline;

means electrically connected to said coils for detecting at least non-symmetrical portions of a Faraday induced electromotive force across said coils; and means responsive to said detecting means to generate electrical signals indicative of the passage of the permanent magnet across said array axis.

10. An array according to claim 9, said cores, coils and spacer being encapsulated in epoxy resin.

11. An array according to claim 10, said resin being contained by inner walls of a metallic housing.

12. An array according to claim 9 further comprising a conduit adapter extending substantially perpendicularly from a midpoint of said spacer and said coils having end leads along said spacer and within said conduit adapter.

13. An array according to claim 12, said cores, coils, spacer and leads being encapsulated in epoxy resin.

14. An array according to claim 13, said resin being contained by inner walls of a metallic housing.

* * * * *